(12) United States Patent
Dezonno et al.

(10) Patent No.: US 6,816,733 B1
(45) Date of Patent: Nov. 9, 2004

(54) TRACKING AGENT CALL PROCESSING LOCATIONS IN CONNECTION WITH AN AUTOMATIC CALL DISTRIBUTION SYSTEM

(75) Inventors: Anthony J. Dezonno, Bloomingdale, IL (US); Mark J. Power, Carol Stream, IL (US); Craig R. Shambaugh, Wheaton, IL (US); Daniel F. Baker, Rolling Meadows, IL (US)

(73) Assignee: Rockwell Electronic Commerce Technologies LLC, Wood Dale, IL (US)

( * ) Notice: Subject to any disclaimer, the term of this patent is extended or adjusted under 35 U.S.C. 154(b) by 0 days.

(21) Appl. No.: 09/476,750

(22) Filed: Dec. 30, 1999

(51) Int. Cl.[7] .................................................. B43L 23/06
(52) U.S. Cl. ............... 455/456.1; 455/445; 379/201.06; 379/265.01
(58) Field of Search ............................ 455/445, 456.1, 455/422.1, 457, 560, 518, 519, 520; 342/450, 456.1; 379/216, 265.01, 266.01, 265.02, 201.06, 201.07, 912, 913; 370/370, 271, 352

(56) References Cited

U.S. PATENT DOCUMENTS

| | | | | |
|---|---|---|---|---|
| 5,008,930 A | * | 4/1991 | Gawrys et al. | 379/265.11 |
| 5,128,981 A | * | 7/1992 | Tsukamoto et al. | 455/450 |
| 5,140,611 A | | 8/1992 | Jones et al. | 375/7 |
| 5,268,903 A | | 12/1993 | Jones et al. | 370/110.1 |
| 5,327,144 A | * | 7/1994 | Stilp et al. | 342/387 |
| 5,335,269 A | | 8/1994 | Steinlicht | 379/266 |
| 5,365,581 A | | 11/1994 | Baker et al. | 379/196 |
| 5,396,540 A | * | 3/1995 | Gooch | 455/456.3 |
| 5,400,327 A | | 3/1995 | Dezonno | 370/62 |
| 5,465,286 A | * | 11/1995 | Clare et al. | 379/32.04 |
| 5,479,482 A | * | 12/1995 | Grimes | 455/556.1 |
| 5,548,637 A | * | 8/1996 | Heller et al. | 379/201.07 |
| 5,793,861 A | * | 8/1998 | Haigh | 257/693 |
| 5,841,854 A | | 11/1998 | Schumacher et al. | |
| 5,914,668 A | * | 6/1999 | Chavez et al. | 340/7.39 |
| 5,918,181 A | * | 6/1999 | Foster et al. | 455/456.1 |
| 5,974,328 A | * | 10/1999 | Lee et al. | 455/456.3 |
| 6,009,333 A | * | 12/1999 | Chaco | 455/456 |
| 6,061,561 A | * | 5/2000 | Alanara et al. | 455/422 |
| 6,236,365 B1 | * | 5/2001 | LeBlanc et al. | 342/457 |
| 6,272,347 B1 | * | 8/2001 | Griffith et al. | 379/265.12 |
| 6,449,356 B1 | * | 9/2002 | Dezonno | 379/265.01 |

OTHER PUBLICATIONS

Derville, D. and Mussig, B., "Call Centers: A Strategic Issue for both Customers and Suppliers," *Alcatel Telecommunications Review* 275–83 (4th Quarter 1996).

* cited by examiner

*Primary Examiner*—Charles Appiah
(74) *Attorney, Agent, or Firm*—Welsh & Katz, Ltd.

(57) ABSTRACT

Method and apparatus for determining and tracking the locations of agents using wireless units to process calls directed through an automatic call distribution system. Based on signals with different cells or based on independent navigation information, locations of wireless units can be monitored and stored for later analysis. In addition, location information can be compared to an agent location schedule to determine adherence and provide adherence reports.

41 Claims, 2 Drawing Sheets

| Act. Code | Call # | Unit # | Time | Loc. Code |
|---|---|---|---|---|
| | | | | |

*FIG. 2*

TRACKING AGENT CALL PROCESSING LOCATIONS IN CONNECTION WITH AN AUTOMATIC CALL DISTRIBUTION SYSTEM

BACKGROUND AND SUMMARY

The present invention relates to tracking agent call processing locations, in connection with an automatic call distribution system, particularly in a wireless agent environment.

Automatic call distribution systems are typically used to distribute telephone calls and other communications among a group of agents of an organization. Automatic call distributor (ACD) systems may be used to distribute calls under any of a number of different formats. In a first instance, the term "call" may be used to refer to a request for communication received from (or placed through) a public switched telephone network (PSTN). A call may also be a voice path based upon packet data transferred through the Internet using web telephony. Alternatively, a call may be any communication such as an e-mail, a facsimile, video, website inquiry received through the Internet, etc. Thus, "ACD systems" are transaction processing systems which typically handle one or more of a wide variety of these "call" types.

Often the organization disseminates a single telephone number, URL or e-mail address to its customers and to the public in general as a means of contacting the organization. As calls are directed to the organization from the PSTN or Internet, the automatic call distribution system directs the calls to its agents using some assignment algorithm, typically based upon availability. For example, where all agents are considered equal, the ACD may distribute the calls based upon which agent position has been idle the longest.

In order to distribute calls, the ACD system is typically provided with at least two routing mechanisms for establishing call paths between callers and agents. A first path may be established from the PSTN to a telephone of the agent using a matrix switch of the ACD.

Alternatives to calls received through the PSTN includes a call received through a computer network such as the Internet, e.g. as a request for Internet telephony, as e-mail or as an inquiry from a visitor to a website maintained by the organization owning the ACD system.

Typically, a controlling computer interacts with a switching fabric to distribute incoming calls from an external communications network including, for example, public telephone networks, internet networks and other communications networks. For traditional telephone calls, a connection to the external network may be in the form of a number of trunk connections. Each of the trunk connections is monitored by the controller for incoming calls. When a call is detected, the controller searches for and selects an idle agent, and commands the switch to form a connection between the incoming trunk and the selected agent.

In other systems, the organization may use a number of telephone numbers to identify different individuals or functions within the organization. Each telephone number may be assigned to a particular incoming trunk or group of incoming trunk lines. The controller may be required to recognize a call target based on the identity of an incoming trunk line, and to route the call accordingly. In other systems, a call target may be identified to the ACD by a signal transferred from the external network. This may be an automatic signal or one based on input from the caller in response to a recorded choice of options.

It may be important for an agent to have ready access to customer files in systems associated with service organizations, where many calls are received and handled by many agents. A database may be maintained of existing customer files, which may be displayed on agent terminals as the agents converse with specific customers. In some cases, the agent may enter a customer identifier into a keyboard associated with the terminal, to identify a customer to the database for display of records on the terminal.

Alternatively, the ACD controller may transfer a customer identifier to the database based on a signal transferred from the external network. When the ACD controller transfers a call to a selected agent, the controller may send a customer identifier and a unit identifier of the selected agent to a database. The customer file can be displayed on a computer monitor of the selected agent when the call is delivered.

As a further feature, calls may be transferred among agents. If a first agent cannot help a particular customer, the agent may activate a key on a keyboard of the agent and enter the identity of another agent or agent group better able to help the customer. The ACD controller may connect the call to the newly identified agent, or place the call in a queue until the identified agent becomes available. A message can be sent to the database identifying the previous and newly identified agents, and the customer file can be displayed at the terminal of the newly identified agent.

Increasingly, agents will be utilizing wireless technology which allows them to process calls without being tied to a hard-wired location. An external caller can be connected to an agent operating a wireless unit, which may provide for voice communication, data communications, or both.

In this new wireless agent environment, there is a need to be able to identify the location of an agent processing a call. Agents may be processing calls at different locations within a physical facility of an organization and may be changing location during a single call, possibly depending on the nature of the call. Agents may be processing calls at different physical facilities of an organization, or possibly away from any physical facility of the organization.

Supervisors and call center administrators need to be able to monitor agent location, and the information needs to be stored in a database for preparation of reports and later analysis. Such agent location information may be useful simply to locate an agent quickly. It may be useful to ensure quality call processing, in the event that an agent is processing calls in an undesirable environment—such as one with high noise, frequent background noise, or other distractions. It may be useful to identify the best places for agents to be located based on where they tend to move to respond to particular types of calls.

Navigation technology and technology concerning the selection of the best wireless signal can be applied to automatically determining the locations of agents using wireless units to process calls. That location information can be stored as part of a transaction management database system. That information can be monitored real time, and reports can be generated to track where calls were handled as well as the movement of agents during calls.

The features of the present invention which are believed to be novel are set forth below with particularity in the appended claims. The invention, together with further advantages thereof, may be understood by reference to the following description in conjunction with the accompanying figures, which illustrate some embodiments of the invention.

BRIEF DESCRIPTION OF THE DRAWINGS

FIG. 2 shows an example of a message format suitable for storing agent location information.

DETAILED DESCRIPTION

Figure 1:
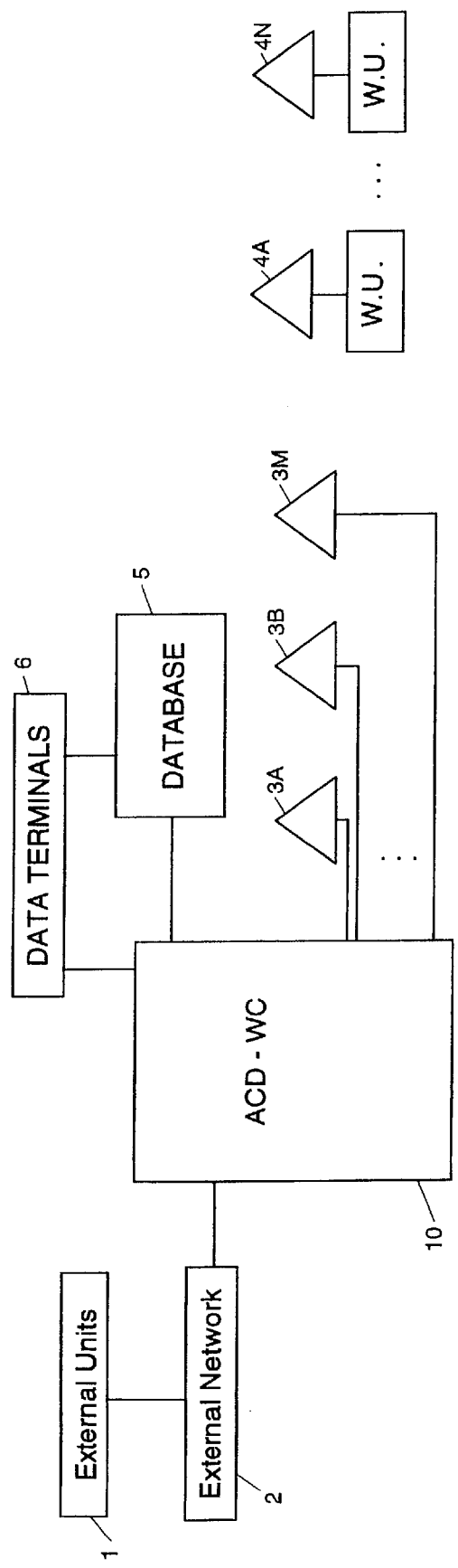
FIG. 1 is a functional block diagram of an example of an automatic call distributor and wireless controller (ACD- WC) system connected with external units, agent wireless units (W.U.), a database, and data terminals for monitoring.

FIG. 1 is a functional block diagram of an automatic call distribution system in accordance with an embodiment of the invention. An ACD-WC system 10 is shown in connection with an external network 2 through which it can be connected to calls from external units 1. The external network may be any type of communications network, for example, public voice telephone network, internet network, LAN, WAN, or other voice and/or data network. The external calls can be any type of communications, wired or wireless including but not limited to public telephone, facsimile, internet data or voice communications, e-mail, voicemail or other data communications.

In the illustrated example of FIG. 1, these external calls may be directed via a plurality of cells 3A, 3B, . . . 3M to different agents of the organization operating wireless units 4A, . . . 4N. A database 5 stores a variety of information. For example, it may store customer files which an agent may need in processing a call. That data may, in one embodiment, be transmitted to and displayed by one of the wireless units 4A, . . . 4N to which the call is directed. Database 5 may also store call records and agent location information. Data terminals 6 may connect with database 5 and with ACD-WC system 10. Data terminals 6 in one embodiment, provide a system interface for supervisory and call center administrator monitoring of real time information including current agent location. They also may permit programming operations in ACD-WC system 10.

Functionally, the exemplary ACD-WC system 10 of FIG. 1 has multiport switching capability controlled by a computer controller in conjunction with peripheral memory. The switching capability may optionally include an analog or digital telephone switching circuit and/or circuitry to control switching of any other types of analog or digital communications including but not limited to facsimile, voice mail, e-mail, voice over IP, video, video over IP, other internet communications, etc. Calls from external units 1 via external network 2 may be directed to wireless units 4A, . . . 4N based on some algorithm. In one embodiment, data such as call records and the locations of wireless units 4A, . . . 4N can be routed to database 5, and data such as customer files can be retrieved from database 5 and routed to a wireless unit 4A, . . . 4N with an associated call.

Control of the switching and communications with database 5 and external exchange 2 may, for example, be accomplished generally as described in U.S. Pat. Nos. 5,268,903 and 5,140,611, both to Jones et al., which are hereby incorporated by reference. Routing of calls to agents may be accomplished, for example, as described in U.S. Pat. No. 5,335,269 to Steinlicht, U.S. Pat. No. 5,365,581 to Baker et al., and U.S. Pat. No. 5,400,327 to Dezonno which are hereby incorporated by reference.

In the embodiment of FIG. 1, all calls are routed to wireless units 4A, . . . 4N. There are other embodiments such as those in which some agents use hard-wired units to process calls, or in which some calls are routed by wireless transmission to a remote ACD system which connects the calls with agents using hard-wired units to process calls. However, it is the mobility of wireless units which creates the need for determining an agent's location.

As stated above, the example ACD-WC system 10 of FIG. 1 has multiport switching capability controlled by a computer controller in conjunction with peripheral memory. In some embodiments, ACD-WC system 10 can comprise an integrated switching fabric. In other embodiments, there may be separate components which interface to create ACD-WC system 10. For example, there can be an automatic call distributor and a separate wireless controller (with a switching matrix, a controller, memory, and transceiver circuitry) connected to cells 3A, 3B, . . . 3M. In some embodiments, there can be analog transmission links between separate components, and there can be digital transmission links in other embodiments. A T-1 line is an example of a digital transmission link with a capacity of 1.544 Megabits per second.

In one embodiment, all of the voice communication and data transmission may be time division multiplexed, permitting the transmission of a plurality of signals via a common route by using different time intervals for the transmission of the intelligence of each signal. In some embodiments, there can be separate multiplexing equipment which can interface with other components to create ACD-WC system 10. Multiplexing can be part of the integrated architecture of ACD-WC system 10 in other embodiments. If multiplexing is used, then wireless units 4A, . . . 4N also include multiplexing equipment.

In some embodiments, voice communication and data transmission can be routed together, and in other embodiments they can be routed separately. For example, data can be transmitted between an automatic call distributor and a separate wireless controller over a local area network (LAN), but voice over LAN capability (known in the art) enables routing data and voice communications together.

In another example, an automatic call distributor may be linked to a wireless data controller for data transmission (such as through a Radiolan BL208 transceiver and Radiolan P101 antenna for use with a computer terminal data device), and linked to a separate wireless controller (such as an Ericsson DCT 1900) for voice communications.

The Digital Enhanced Cordless Telecommunications (DECT) standard developed in Europe also permits wireless data transmission as well as voice communication.

In some embodiments having separate voice and data transmissions, the locations of wireless units 4A, . . . 4N can be determined using one of the two types of transmissions, and the other type of transmission can efficiently track the first type. For example, data associated with a particular type of call (such as multi-media or computer/telephony integration) may need to reach an agent moving through different locations. As a voice/internet protocol switches between cells 3A, 3B, . . . 3M, that information can be used to instruct the data path to follow the agent through different cell sites.

Any known wireless transmission technology may be used. For example, fixed frequency modulation (i.e. using a single frequency) may be used. Another embodiment may utilize a data IP packet transmission modulation method (e.g. for phones connecting over a wireless voice over IP network). In another desirable embodiment the wireless transmissions use spread spectrum broadcast technology. This embodiment requires ACD-WC system 10 and wireless units 4A, . . . 4N to include spread spectrum modulation capability. Spread spectrum is a modulation technique in which information is spread over a much wider bandwidth than the frequency content of the original information, and enables the transmission to be less dependent on the natural characteristics and other interference in the original narrower band.

In some embodiments, there can be a plurality of interconnected automatic call distributors and wireless controllers. Some can be located in different geographic locations. They may be interconnected, for example, by private integrated services digital network (ISDN) lines (e.g., leased lines, virtual private lines, microwave links, etc.). Similarly, they may be connected with database 5 through an appropriate data link (e.g., leased lines, virtual private lines, microwave link, the Internet, digital packet switching, etc.).

It is often desirable for wireless units 4A, . . . 4N to have both voice and data capability (e.g. Internet capable). This can be separate wireless telephones and wireless data terminals in some embodiments. It can be a common transceiver into which a telephone and separate data terminal can be interfaced in other embodiments, and there can be totally integrated wireless units in still other embodiments. It is also preferable for the agent to be able not only to monitor data, but to input data as well, which may be valuable in many applications in which customer files are modified as a result of a call. As mentioned above, it is preferable for the wireless units 4A, . . . 4N to include time division multiplexing and spread spectrum capability.

In some embodiments, cells 3A, 3B, . . . 3M can be located over a relatively large geographic area as with standard cellular telephony. In other embodiments, cells 3A, 3B, . . . 3M can be located within a much smaller geographic area with high telephone traffic density. An example of the latter is the Ericsson Freeset Business Wireless Telephone System.

With technology commonly used today in connection with cellular telephones, signal strengths and/or signal clarity between one of wireless units 4A, . . . 4N and different cells 3A, 3B, . . . 3M can be compared and the closest of cells 3A, 3B, . . . 3M can be determined. One of the known ways in which signal clarity may be measured is by examining the integrity of a known data test sequence which is transmitted.

One of wireless units 4A, . . . 4N can search assigned frequencies to determine which of cells 3A, 3B, . . . 3M has the strongest and/or the clearest signal. Such comparison can be done on a continual basis, since the closest of cells 3A, 3B, . . . 3M will change as that one of wireless units 4A, . . . 4N moves. Information indicative of the cell 3A, 3B, . . . 3M closest to a particular one of wireless units 4A, . . . 4N can be obtained by that one of wireless units 4A, . . . 4N and transmitted to ACD-WC system 10. Such information also can be obtained by comparing signals received at the different cells 3A, 3B, . . . 3M from a particular one of wireless units 4A, . . . 4N.

In some embodiments, the known locations of the different cells 3A, 3B, . . . 3M are all within a relatively small geographic area, such as within the immediate vicinity of a single physical facility. In such a case, the identity of which of cells 3A, 3B, . . . 3M is closest to a particular one of wireless units 4A, . . . 4N may sufficiently identify the location of the agent. For example, that cell identity may indicate a particular room in a physical facility.

In other embodiments, an agent's location may be determined by triangulation, such as by using the strength of signals between one of wireless units 4A, . . . 4N and a plurality of cells 3A, 3B, . . . 3M. Received signal strength correlates with distance from a signal source of known power output. Since the locations of cells 3A, 3B, . . . 3M are known, and the power output of cells 3A, 3B, . . . 3M and of wireless units 4A, . . . 4N are also known, the distance between one of wireless units 4A, . . . 4N and each of a plurality of cells 3A, 3B, . . . 3M can be determined. The location of that one of wireless units 4A, . . . 4N can then be determined by triangulation.

In other embodiments, wireless units 4A, . . . 4N can transmit information indicative of their locations, which is derived independently of cells 3A, 3B, . . . 3M. For example, position information can be derived from signals transmitted from other points which are known or ascertainable. In one such embodiment, wireless units 4A, . . . 4N may be equipped with a navigation system such as the Global Positioning System (GPS). In some embodiments, a system such as a GPS system can be supplemented by an inertial navigation system which allows dead reckoning from a given position (such as a GPS determined position), with the possible use of a gyroscope and/or accelerometers.

In still other embodiments where there are many wireless units 4A, . . . 4N in a single large enclosure, communication can be accomplished with infrared signals.

Regardless of how it is determined, the location of one of wireless units 4A, . . . 4N can be represented by a location code. For example, in some embodiments, that code can be an identifier of the closest of cells 3A, 3B, . . . 3M. In some embodiments, that code can reference a point or an area on a map grid. Just as an ACD controller executes a sequence of database commands for placing other call processing information in a database, the location of wireless units 4A, . . . 4N can be stored. For example, in one embodiment, the location may be stored to an event table in database 5.

Figure 2:
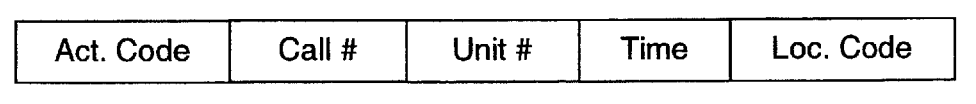

FIG. 2 shows an example of an applicable message format. The illustrated example format shows fields for an activity code (Act. Code), a call identifier (Call #), a unit identifier (Unit #), a timestamp (Time), and a location code (Loc. Code). Examples of activities generating messages can be events such as call arrival (CA) at one of wireless units 4A, . . . 4N, call established (CE)—e.g., agent answers call or call continues at new location, call cleared (CC), enter cell (EC) and leave cell (LC)—as the closest cell changes. In the illustrated example of FIG. 2, a call identifier can be assigned by a controller in ACD-WC system 10 before a call is routed to an agent. A unit identifier can be preprogrammed for each of wireless units 4A, . . . 4N to identify where a call is routed, or to where it is transferred if a first agent transfers a call to another agent. The timestamp can be useful for compiling reports concerning the length of time a particular agent, or agents in general, spend in different locations.

In an embodiment mentioned above, the identity of the closest of cells 3A, 3B, . . . 3M may sufficiently identify the location of the agent in the immediate vicinity of a physical facility. An example of a typical scenario could include the third incoming call at 9:01 a.m. on the 45th day of 1999. It was directed to wireless unit #56 in cell site A at 9:01 a.m., which was answered at 9:02. The agent moved through cell site B at 9:03, and into cell site C at 9:04, and transferred the call to wireless unit #78 in cell site D at 9:08. The first agent returned to cell site A at 9:09, and the second agent terminated the call at 9:13. The following series of messages could be generated to reflect such a scenario. The different codes and identifiers could be entered in appropriate fields in an event table in database 5:

| Act.Code | Call # | Unit # | Time | Loc.Code |
| --- | --- | --- | --- | --- |
| CA | 19990450901003 | 56 | 0901 | A |
| CE | 19990450901003 | 56 | 0902 | A |

-continued

| Act.Code | Call # | Unit # | Time | Loc.Code |
|---|---|---|---|---|
| LC | 19990450901003 | 56 | 0903 | A |
| EC | 19990450901003 | 56 | 0903 | B |
| CE | 19990450901003 | 56 | 0903 | B |
| LC | 19990450901003 | 56 | 0904 | B |
| EC | 19990450901003 | 56 | 0904 | C |
| CE | 19990450901003 | 56 | 0904 | C |
| CC | 19990450901003 | 56 | 0908 | C |
| CA | 19990450901003 | 78 | 0908 | D |
| CE | 19990450901003 | 78 | 0908 | D |
| LC | — | 56 | 0909 | C |
| EC | — | 56 | 0909 | A |
| CC | 19990450901003 | 78 | 0913 | D |

In some embodiments, an agent's location can be regularly stored in an event table in database 5. This information can be monitored in real time at data terminals 6 which may connect with database 5 and with ACD-WC system 10. Reports, based on information in ACD-WC system 10 and/or database 5, also can be generated to track where calls are handled as well as the movement of agents.

In other embodiments a schedule can be generated and stored which establishes a plan for the location of one or more staff members during their shifts. For example, a schedule could comprise a table providing the locations, start time and stop time for each location for staff members for a particular day (e.g. a staff member may be scheduled to be in different locations as the day progresses). In one embodiment of the invention, the schedule information can be compared to the location information to detect deviation from the schedule. If a staff member does not adhere to the schedule, a location deviation display can show any deviations, such as on the data terminal 6. This display may include real-time display of location deviations and/or other location information. From this display, a Supervisor can determine when a staff member is in a location deviation state and can take appropriate action (e.g. call or visit the staff member to determine the cause). Written deviation reports can also be generated. In an alternative embodiment, the system 10 can compare location data to the schedule to detect a deviation and an alarm (e.g. flashing a deviation message on a display) can be generated to alert the supervisor.

In the embodiment of FIG. 1, database 5 is shown separately from ACD-WC system 10. In other embodiments, appropriate computer memory can be integrated into the architecture of ACD-WC system 10.

The embodiments discussed and/or shown in the figures are examples. They are not exclusive ways to practice the present invention, and it should be understood that there is no intent to limit the invention by such disclosure. Rather, it is intended to cover all modifications and alternative constructions and embodiments that fall within the scope of the invention as defined in the following claims.

What is claimed is:

1. A method of tracking and reporting agent location information in an automatic call distributor (ACD) system having one or more wireless agents operating wireless communication units to process calls directed through the ACD system, the method comprising:
   determining location information for one or more wireless agents in connection with a call to an agent;
   storing at least a portion of the location information in association with a call identifier; and
   reporting at least a portion of the agent location information for at least one wireless agent;
   wherein the reporting includes at least one of a) reporting amounts of time the at least one agent spends in different locations, b) reporting composite amounts of time a group of the one or more agents spends in different locations, c) reporting different locations of the at least one agent in connection with the call, d) reporting composite agent location information in connection with calls to agents, and e) reporting a specific time associated with at least one activity in connection with the call.

2. The method as in claim 1 wherein the ACD system includes a wireless system having a plurality of cells of known location and wherein the determining step comprises examining signals transmitted between a wireless agent unit and at least one of the cells and identifying the cell with the strongest signals.

3. The method as in claim 1 wherein the ACD system includes a wireless system having a plurality of cells of known location and wherein the determining step comprises identifying the cell with the clearest signals.

4. The method as in claim 1 wherein the wireless communication units utilize spread spectrum modulation.

5. The method as in claim 1 wherein the ACD system includes a wireless system having a plurality of cells of known location and wherein the determining step comprises examining signals which are transmitted by different cells of the plurality of cells and received by at least one agent wireless unit.

6. The method as in claim 1 wherein the determining step comprises utilizing GPS signals to determine at least a portion of the location information.

7. The method as in claim 1 wherein the step of reporting comprises providing the agent location information to a real time information display.

8. The method as in claim 1 wherein the step of reporting comprises generating an alarm in response to the location information deviating from a schedule.

9. The method as in claim 1 wherein the storing step includes storing data reflecting at least a wireless unit identifier and a location code.

10. The method as in claim 9 wherein the storing step includes entry of data in a table with fields for at least two of a) an activity code, b) a call type, c) a wireless unit identifier, and d) a location code.

11. The method as in claim 1 further comprising the step of reporting an agent's location based on the stored information.

12. The method of claim 1 wherein the ACD system includes a wireless system having a plurality of cells and wherein the determining step comprises determining at least a portion of the agent location information from position information transmitted by the agent's wireless unit which is derived independently of the cells.

13. The method as in claim 12 wherein the determining step further comprises deriving the position information from navigation system signals transmitted from points of ascertainable locations.

14. The method as in claim 12 wherein the determining step further comprises deriving the position information at least partially from an inertial navigation system.

15. The method as in claim 1 further comprising the steps of maintaining historical location information and identifying desirable agent locations for identified tasks based upon the historical location information.

16. The method as in claim 1 wherein at least one wireless unit can handle voice and at least one can handle data communications and further comprising the step of determining location information separately for voice and data communications.

17. The method as in claim 1 further comprising the step of comparing the agent location information to an agent location schedule and detecting deviation of agent location from scheduled agent location.

18. The method as in claim 1 wherein the wireless communications units utilized fixed frequency modulation.

19. The method as in claim 1 wherein the wireless communications units utilized a data IP packet transmission modulation.

20. The method as in claim 1 wherein the step of reporting comprises providing agent location information and other agent information to a database report.

21. The method as in claim 1 wherein location information for data is stored separate from voice location information for at least a portion of any data transmitted.

22. The method as in claim 1,
wherein the ACD system includes a wireless system having a plurality of cells for transmitting separate voice and data transmissions;
wherein the determining step uses one of the separate voice and data transmissions; and
further comprising the step of the other, of the voice and data transmissions, tracking the location information determined in the determining step.

23. A location tracking system in an automatic call distribution (ACD) system including a wireless controller system, with a plurality of cells for transmitting separate voice and data transmissions, and at least one wireless unit comprising:
a) locator circuitry which determines location information of at least one unit of the at least one wireless units, in connection with a call directed through the ACD system to the at least one unit, using the separate voice transmissions;
b) tracking circuitry for the data transmissions to track the location information determined by the locator circuitry;
c) memory in which location information is stored; and
d) report generator which reports agent location information for at least one wireless agent within the ACD system.

24. The apparatus as in claim 23 wherein the location of at least one wireless unit can be determined by identifying a single cell with the strongest signals.

25. The apparatus as in claim 23 wherein the location of at least one wireless unit can be determined by identifying the single cell with the clearest signals.

26. The apparatus as in claim 23 wherein the report generator determines deviation between a location schedule and the location information and generates a deviation report.

27. The apparatus as in claim 23 further comprising a data terminal, wherein the location of the one unit can be monitored real time by access to the data terminal.

28. The apparatus as in claim 23 wherein the report generator generates an alarm in response to detection of deviation between the location information and an agent location schedule.

29. The apparatus as in claim 23 wherein the memory comprises a table with fields for at least a wireless unit identifier and a location code.

30. The apparatus as in claim 23 wherein the report generator generates both a location information report and a deviation report.

31. The apparatus as in claim 30 wherein the report generator generates location information reports and deviation reports in real time.

32. The apparatus as in claim 23, wherein the memory comprises a table with fields for at least a call identifier and a location code.

33. An apparatus for tracking and reporting agent location information in an automatic call distributor (ACD) system including a wireless system, with a plurality of cells for transmitting separate voice and data transmissions, and having at least one wireless unit, the apparatus comprising:
means for determining agent location information for one or more of the agents, in connection with a call directed through the ACD system to an agent, using the separate voice transmissions;
means for the data transmissions to track the location information determined by the determining means;
means for storing at least a portion of the agent location information in association with a call identifier; and
means for reporting agent location information for at least one agent.

34. The apparatus as in claim 33 wherein the determining means comprises means for identifying a single cell with the strongest signals.

35. The apparatus of claim 33 wherein the determining means comprises means for identifying a single cell with the clearest signals.

36. The apparatus of claim 33 wherein the determining means comprises means for examining strength of the signals between the wireless unit and a plurality of the cells.

37. The apparatus of claim 33 further comprising means for displaying information real time and means for providing at least one agent's location to the displaying means.

38. The apparatus of claim 33 wherein the reporting means comprises means for generating an alarm in response to the location information deviating from an agent location schedule.

39. The apparatus as in claim 38 wherein the means for reporting comprises means for comparing agent location information to an agent location schedule to determine deviation information.

40. The apparatus of claim 33 wherein the means for determining agent location information utilizes position information transmitted by the wireless unit at least a portion of which is derived independently of the at least one cell.

41. The apparatus of claim 40 further comprising means for comparing the location information to an agent location schedule to detect deviations from the schedule.

* * * * *